(12) United States Patent
Tah et al.

(10) Patent No.: US 11,204,777 B1
(45) Date of Patent: Dec. 21, 2021

(54) BOOT FROM SAN OPERATION SUPPORT ON MULTI-PATHING DEVICES

(71) Applicant: EMC IP Holding Company LLC, Hopkinton, MA (US)

(72) Inventors: Arnab Tah, Bangalore (IN); Vighneshwar Hegde, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/106,435

(22) Filed: Nov. 30, 2020

(51) Int. Cl.
*G06F 9/4401* (2018.01)
*G06F 13/16* (2006.01)

(52) U.S. Cl.
CPC .......... *G06F 9/4416* (2013.01); *G06F 9/4411* (2013.01); *G06F 13/1668* (2013.01)

(58) Field of Classification Search
CPC .... G06F 9/4401; G06F 9/4411; G06F 9/4416; G06F 13/1668
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Racherla et al.; "SAN Boot Implementation and Best Practices Guide for IBM System Storage"; IBM International Support Organization; International Business Machines Corporation, Sep. 2012; pp. iii-viii, 2-5, 107-118, 181-196, 258-263, 374-393. (Year: 2012).*

(Continued)

*Primary Examiner* — Glenn A. Auve
(74) *Attorney, Agent, or Firm* — Ryan, Mason & Lewis, LLP (57) ABSTRACT

A host device is configured to communicate over a network with a storage system. The host device comprises a multi-path input-output (MPIO) driver configured to control delivery of input-output (IO) operations from the host device to the storage system over selected ones of a plurality of paths through the network. The MPIO driver is further configured to create a disk device on the host device, wherein the disk device corresponds to a subset of the plurality of paths to the storage system, and to execute a script enabling a boot image create operation to run on the created disk device.

20 Claims, 6 Drawing Sheets

(56) References Cited

U.S. PATENT DOCUMENTS

| | | |
|---|---|---|
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B1 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0243796 A1* | 12/2004 | Keohane ............ H04L 41/0806 713/2 |
| 2005/0083749 A1* | 4/2005 | Keohane ................ H04L 67/34 365/222 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0106955 A1* | 4/2010 | Odell ................. G06F 11/1417 713/2 |
| 2010/0162047 A1* | 6/2010 | Haley ................ G06F 11/3688 714/37 |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0026124 A1* | 1/2014 | Gilbert ...................... G06F 8/70 717/124 |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

E. Melton, "PVID Info and Manipulation—for the Advanced AIX Administrator," https://mainline.com/pvid-info-manipulation-advanced-aix-administrator/, Sep. 6, 2017, 5 pages.

IBM Knowledge Center, "Creating a Boot Image on a Boot Logical Volume," https://www.ibm.com/support/knowledgecenter/ssw_aix_72/osmanagement/createbootimglog.html, Accessed Nov. 13, 2020, 1 page.

IBM Knowledge Center, "Disk Arrays," https://www.ibm.com/support/knowledgecenter/P9ESS/p9ebj/sasdiskarrays.htm, Accessed Nov. 2, 2020, 4 pages.

IBM Knowledge Center, "Physical and Logical Volumes," https://www.ibm.com/support/knowledgecenter/SSAL2T_8.1.0/com.ibm.cics.tx.doc/concepts/c_physical_and_logical_volumes.html, Accessed Nov. 2, 2020, 3 pages.

IBM Support, "'bosboot', 'mksysb' and hdiskpower Devices," https://www.ibm.com/support/pages/bosboot-mksysb-and-hdiskpower-devices[, Accessed Nov. 12, 2020, 3 pages.

IBM Knowledge Center, "bosboot Command," https://www.ibm.com/support/knowledgecenter/ssw_aix_72/b_commands/bosboot.html, Accessed Nov. 2, 2020, 7 pages.

U.S. Appl. No. 16/697,393 filed in the name of Vinay G. Rao et al. filed Nov. 27, 2019, and entitled "Automated Seamless Migration of Logical Storage Devices.".

(56) References Cited

OTHER PUBLICATIONS

U.S. Appl. No. 16/710,828 filed in the name of Amit PundalikAnchi et al. filed Dec. 11, 2019, and entitled "Automated Seamless Migration with Signature Issue Resolution.".

* cited by examiner

```
bash-4.2# PP_pseudo_bosboot enable
bash-4.2#
bash-4.2# bosboot -ad /dev/hdiskpower10
bosboot: Boot image is 65564 512 byte blocks.
bash-4.2#
```
501

```
bash-4.2# lslv -l hd5
hd5:N/A
PV              COPIES          IN BAND     DISTRIBUTION
hdiskpower10    001:000:000     100%        001:000:000:000:000
bash-4.2# bosboot -ad /dev/hdiskpower10 bosboot: Boot image is 65564 512 byte blocks.
```
505

```
bash-4.2# lspv|grep hdiskpower10
hdiskpower10    00f84a05ffb023c3    rootvg    active
```
510

FIG. 5

```
bash-4.2# pp_pseudo_bosboot disable
bash-4.2#
bash-4.2# bosboot -ad /dev/hdiskpower10
0301-154 bosboot: missing proto file: /usr/lib/boot/network/chrp.hdiskpower.proto
bash-4.2#
```

BOOT FROM SAN OPERATION SUPPORT ON MULTI-PATHING DEVICES

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system.

In a boot from storage array network (SAN) scenario, servers utilize an operating system installed on external SAN-based storage to boot up rather than booting off the local internal disk of the server or direct attached storage. Boot from SAN allows for increased server density, easier server replacement by having a new server point to the previously used boot from SAN location, elimination of local disks on the servers, and increased reliability because a boot device can be accessed through multiple paths, avoiding a single point of failure.

SUMMARY

Illustrative embodiments configure a multi-path layer of one or more host devices to include functionality for boot from SAN operation support on multi-pathing devices. For example, some embodiments include techniques for providing boot image creation operation support on multi-pathing devices.

In one embodiment, an apparatus comprises a host device configured to communicate over a network with a storage system. The host device comprises an MPIO driver configured to control delivery of IO operations from the host device to the storage system over selected ones of a plurality of paths through the network. The MPIO driver of the host device is further configured to create a disk device on the host device, wherein the disk device corresponds to a subset of the plurality of paths to the storage system, and to execute a script enabling a boot image create operation to run on the created disk device.

In some embodiments, a bosboot command may be used to create a boot image from a random-access memory (RAM) disk file system and a kernel. The boot image interfaces with machine boot read-only storage (ROS) erasable programmable read-only memory (EPROM). A bosboot command is supported by particular operating systems (e.g., AIX operating systems), but may not be supported on some devices utilizing other operating systems (e.g., non-AIX operating systems). Absent use of techniques disclosed herein, in order to enable activities requiring execution of bosboot commands, system administrators must perform extensive operational tasks when multi-pathing devices do not support bosboot functionality.

Advantageously, in one or more embodiments, during boot from SAN operations on multi-pathing devices that are not configured to support bosboot operations, a script which will modify a bosboot script is invoked, thereby enabling bosboot command support on such non-configured devices.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
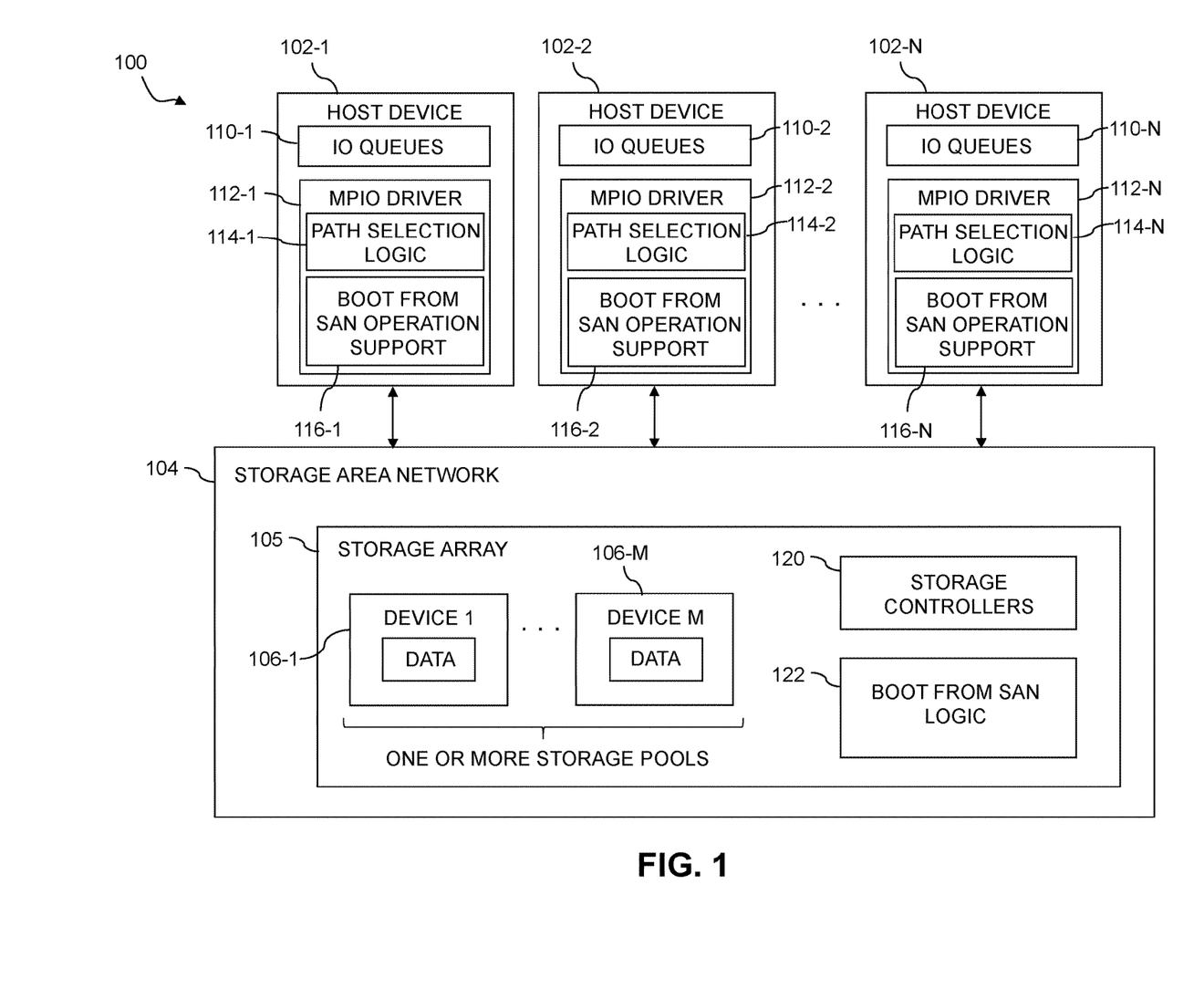
FIG. 1 is a block diagram of an information processing system configured with functionality in a multi-path layer of a host device for boot from SAN operation support in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement LUNs configured to store objects for users associated with the host devices 102. These objects can comprise files, blocks or other types of objects. In a boot from SAN scenario, servers utilize an operating system installed on external SAN-based storage, such as, for example, on a LUN, to boot up rather than booting off the local internal disk of the server or direct attached storage.

As used herein, the term "server" is to be broadly construed, and may encompass a host device, such as, for example, host device 102-1, a portion of a host device or a processing device separate from a host device.

The host devices 102 interact with the storage array 105 utilizing read and write commands as well as other types of commands, such as, for example, log select and log sense commands described further herein, that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "TO" should be understood to refer to input and/or output. Thus, an TO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of TO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N, respective MPIO drivers 112-1, 112-2, . . . 112-N and respective instances of path selection logic 114-1, 114-2, . . . 114-N. The MPIO drivers 112 collectively comprise a multi-path layer of the host devices 102. The multi-path layer provides functionality for boot from SAN operation support. Such functionality is provided at least in part using respective instances of boot from SAN operation support logic 116-1, 116-2, . . . 116-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for boot from SAN operation support. Other types of MPIO drivers from other driver vendors may be suitably modified to incorporate functionality for boot image create operation support as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, log select and log sense commands as described herein, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As is apparent from the foregoing, MPIO driver 112-1 of host device 102-1 is configured to control delivery of IO operations from the host device 102-1 to the storage array 105 over selected paths through the SAN 104.

The MPIO driver 112-1 is further configured with boot from SAN operation support logic 116-1 to create a disk device on the host device 102-1. The disk device corresponds to a subset of the plurality of paths to the storage system. In one or more embodiments, the subset of the plurality of paths comprises one or more hdisks, and the created disk device comprises an hdiskpower device.

As used herein, an "hdiskpower" device refers to a disk device supported by and running on PowerPath® drivers from Dell Technologies. The embodiments, however, are not necessarily limited to disk devices supported by and running on AIX operating systems, and may comprise disk devices supported by and running on MPIO drivers other than PowerPath® drivers.

As used herein, an "hdisk" refers to a path to a disk device. In an example embodiment, an hdisk is supported by and runs on an AIX operating system, and is a path to an hdiskpower device. The path may run between the hdiskpower and a storage device of a storage array. The embodiments are not necessarily limited to paths supported by and running on AIX operating systems, and may comprise paths supported by and running on other operating systems.

The boot from SAN operation support logic 116-1 executes a script enabling a boot image create operation to run on the created disk device. The script modifies a boot image create operation utility to allow the boot image create operation to be performed on a specified category of devices corresponding to the created disk device. In one or more embodiments, the boot image create operation comprises a bosboot operation and the specified category comprises hdiskpower devices.

Several system administrator tasks require building operating system boot images, which can be accomplished by running bosboot commands. The tasks include, for example, installing kernel patches or creating a system backup. As bosboot commands are not supported on multiple non-AIX multi-pathing devices, system administrators are forced to perform numerous operations such as, for example, physical volume identification (PVID) manipulation (e.g., moving a root volume group (rootvg) back and forth), and other procedures needed to build operating system boot images.

Conventional approaches provide a pprootdev utility to circumvent restrictions associated with the bosboot command. For example, the pprootdev tool changes AIX configuration rules and updates a boot image to enable an AIX logical volume manager to use different multi-pathing devices to vary the rootvg when a system boots. The pprootdev utility can be used to move PVIDs for a rootvg from hdiskpower device(s) to corresponding hdisks/paths prior to carrying out any administrative task that runs bosboot.

However, the pprootdev utility has drawbacks. For example, many customer environments have automated system backup and update procedures. The customer environments may add a pprootdev fix as part of an inittab configuration file to ensure that a PVID remains on an hdisk during a host boot, so that bosboot commands running during automated procedures would not fail. However, AIX operating systems do not recommend continuously keeping a PVID on an hdisk, and advise that PVIDs for a rootvg be moved back to an appropriate hdiskpower device(s) after performing a bosboot operation. The reason for this is that a logical volume manager (LVM) relies on the location of a rootvg's PVID for the purposes of accessing a rootvg. When the PVIDs are on the hdisk(s), an LVM will choose exactly one hdisk (e.g., path) for a rootvg. In the event of path issues to the rootvg LUNs, the system may become unresponsive because the LVM will be accessing the rootvg via a single hdisk, rather than the hdiskpower device(s), which include all native paths. When PVIDs are on the hdisks and one hdisk/path is selected for a rootvg, there is also a possibility of slow-performance of the system since swap space resides on a SAN in a boot from SAN environment.

According to illustrative embodiments, during boot from SAN operations on non-AIX multi-pathing devices (e.g., MPIO driver 112-1), a script which will modify an AIX bosboot script, is invoked. This enables bosboot support on non-AIX (e.g., hdiskpower) devices, which eliminates the need for a pprootdev script to move a PVID from a non-AIX operating system device to an AIX operating system device prior to running a bosboot operation.

In the FIG. 1 embodiment, the storage array 105 comprises a plurality of storage controllers 120 and one or more instances of boot from SAN logic 122. A more detailed example of the boot from SAN logic 122 will be described below in conjunction with the embodiments of FIGS. 1 through 6.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

In the FIG. 1 embodiment, one or more of the storage devices 106, such as a logical storage device, like a LUN, is provisioned as a boot from SAN device for a server, so that the logical storage device is used for booting the server instead of booting off a local internal disk of the server or direct attached storage. The server may be a server on which the host device resides or otherwise associated with the host device. Alternatively, the server may be independent of the host device.

According to an embodiment, when a storage controller 120 assigns a storage device 106-1 from a storage array 105 to a host device 102-1, the host device 102-1 sees each path of the device 106-1 as an hdisk. Then, the host device 102-1, for example the MPIO driver 112-1 (e.g., boot from SAN operation support logic 116-1), creates an hdiskpower device (also referred to herein as a pseudo device).

Identifying information of an hdiskpower device includes, for example, a pseudo name (e.g., hdiskpower123), a symmetrix ID (e.g., 000123456789), a logical device ID (e.g., 00000A123), a device world-wide name (e.g., 01234567890987654321), a state (e.g., alive), a policy (e.g., SymmOpt) and the number of queued IOs. Data for hdisks corresponding to an hdiskpower device is shown in the following Table 1.

TABLE 1

| hdisk | H/W Path | Mode | State | Queued IOs | Errors |
|---|---|---|---|---|---|
| hdisk123 | fcsi1 | Active | Alive | 0 | 0 |
| hdisk456 | fcsi1 | Active | Alive | 0 | 0 |
| hdisk789 | fcsi0 | Active | Alive | 0 | 0 |

In the following steps, tasks described as being performed by the host device 102-1 may be performed by the MPIO driver 112-1, including the boot from SAN operation support logic 116-1. According to an embodiment, the host device 102-1 executes a command (e.g., #bootinfo -s hdiskx) to locate an hdisk ("hdiskx") corresponding to a storage device 106-1 with adequate space for accommodating an operating system of the host device 102-1 (e.g., 20 GB). Then, the host device 102-1 executes a command (#powermt display dev=hdiskx) to determine which pseudo device (e.g., hdiskpower device) corresponds to the hdiskx and the other hdisks corresponding to the hdiskpower device.

The host device 102-1 executes a command (e.g., #lsdev -Ct power|awk '{print $1}'|xargs -n1 rmdev -l) to move all the hdiskpower devices assigned to the host device 102-1 from an available state to a defined state. A defined state refers to a state whereby a device is neither configured nor available for use. All the devices assigned to the host device 102-1 includes the hdiskpower device comprising hdiskx. According to an embodiment, only the hdiskpower device states and not the hdisk states are being changed.

The host device 102-1 executes a command (e.g., #chdev -l hdiskx -a pv=clear) to clear the PVID of all the native disks (hdiskx and other hdisks) corresponding to the hdiskpower device (pseudo device). The host device 102-1 executes a command (e.g., #alt_disk_install -C hdiskx) to create a copy of the operating system of the host device 102-1 on a storage device 106-1 of the storage array 105 corresponding to hdiskx.

The host device 102-1 executes a command (e.g., #bootlist -m normal hdisk123 hdisk456 hdisk789) to a bootlist, which is a list of devices/paths from which the host device 102-1 can be booted. In this example, there are multiple paths through which the host device 102-1 can be booted (e.g., hdisk123, hdisk456, hdisk789), so that if one path fails, the host device can boot from another path.

The host device 102-1 executes a command (e.g., #shutdown -Fr) to reboot the host device 102-1 so that the hdisk used for booting and the copy of the operating system appear on the rebooted host device 102-1. According to an embodiment, the host device 102-1 will be booted via the hdisk and corresponding storage device on which a copy of the operating system was created.

The host device 102-1 executes one or more commands to execute a script enabling a boot image create operation to run on the hdiskpower device corresponding to hdiskx and the other hdisks (e.g., hdisk 123, hdisk456 and hdisk789). The script modifies a boot image create operation utility (e.g., bosboot) to allow the boot image create operation to be performed on hdiskpower devices. According to an embodiment, the one or more commands are as follows:

bash-4.2#PP_pseudo_bosboot enable
bash-4.2#
bash-4.2#bosboot -ad/dev/hdiskpower10
bosboot: Boot image is 65564 512 byte blocks.
bash-4.2#

The bosboot utility creates a boot image. Without execution of the script, the bosboot utility would run on an hdisk only and an additional reboot as well as further steps would be required to move the created boot image to an hdiskpower device. For example, the use of the pprootdev utility necessitates two reboots of a host during boot from SAN operations; first, after running the pprootdev utility, and second, after creating a boot image with bosboot, thereby increasing the steps involved in boot from SAN procedures. According to illustrative embodiments, during boot from SAN operations on non-AIX multi-pathing devices, the script enables bosboot support on non-AIX (e.g., hdiskpower) devices, which eliminates the need for a pprootdev script to move a PVID from a non-AIX operating system device to an AIX operating system device prior to running a bosboot operation. The script enables execution of the bosboot utility directly on the hdiskpower device, which obviates the need for the additional reboot and the further steps. The boot image is pushed to the hdisks and the hdiskpower device.

In order for the newly created boot image to take effect, the host device 102-1 is rebooted using, for example, the command #shutdown -Fr. Following the reboot, the operating system will point to the hdiskpower device and multi-pathing benefits will be effective.

The host device 102-1 executes a command (e.g., #lslv -l hd5) to generate a boot logical volume on the hdiskpower device responsive to the creation of the boot image and rebooting of the host device 102-1.

Information can be obtained by the host device 102-1 from the storage array 105, or information can be obtained by the storage array 105 from the host device 102-1 utilizing an in-band communication mechanism in which one or more predetermined commands in a designated storage protocol are sent from the host device 102-1 to the storage array 105 or vice versa. As noted herein above, such predetermined commands can comprise, for example, log sense and log select commands, a mode sense command, a VU command, or combinations of multiple instances of these or other commands, in an otherwise standardized command format, such as a SCSI format or other type of format.

Additionally or alternatively, information can be obtained by the host device 102-1 from the storage array 105, or information can be obtained by the storage array 105 from the host device 102-1 utilizing an out-of-band communication mechanism. For example, an out-of-band communication mechanism of this type can involve host management software of the host device 102-1 communicating with storage array management software of the storage array 105 over an IP network connection or other type of network connection.

As noted above, these and other functions related to boot from SAN operation support tasks may be performed by the MPIO driver 112-1, including the boot from SAN operation support logic 116-1. In some embodiments, these tasks may be performed at least in part outside of the MPIO driver 112-1, such as in the host device 102-1 generally.

References herein to an MPIO driver such as MPIO driver 112-1 being configured to support boot from SAN operations (e.g., bosboot operations) are intended to be broadly construed, and should not be viewed as being limited to any particular storage arrangement, such as storage in a particular host device component or using a particular format. Accordingly, such storage can be in a memory or other storage device that is outside of the MPIO driver.

As indicated previously, absent use of the techniques for executing a script enabling a boot image create operation to run on an hdiskpower device as disclosed herein, a pprootdev utility must be executed to circumvent restrictions associated with the bosboot command. The pprootdev utility moves PVIDs for a rootvg from hdiskpower device(s) to corresponding hdisks/paths prior to running a bosboot operation. However, AIX operating systems do not recommend continuously keeping a PVID on an hdisk, and recommend moving PVIDs for a rootvg back to an appropriate hdiskpower device(s) after performing a bosboot operation. In addition, when there are path issues to the rootvg LUNs, a system may be unresponsive because the LVM will be accessing the rootvg via a single hdisk, rather than the hdiskpower device(s), which include all native paths. Additionally, there is also a possibility of slow-performance of the system since swap space resides on a SAN in a boot from SAN environment. As an additional drawback, when host scan operations (e.g., cfgmgr/powermt config) are performed, PVIDs will move from hdisks to hdiskpower devices, which results in failure of a customer environment's automated procedures that require bosboot operations.

Such drawbacks are advantageously overcome in illustrative embodiments herein by utilization of a multi-path layer comprising one or more of the MPIO drivers 112 to execute a script to support boot from SAN operations (e.g., bosboot operations) on non-AIX devices (e.g., hdiskpower devices) as described above. These embodiments therefore provide a significant advance over conventional techniques that require use of the pprootdev utility. For example, illustrative embodiments are advantageously configured to leave PVIDs on non-AIX multi-pathing devices (e.g., hdiskpower devices) at any given point of time. Thus, multipathing and redundancy to a boot device is ensured. In addition, as there is no requirement of moving PVIDs to hdisks for bosboot operations to succeed, a customer's automated maintenance procedures are supported without needing any extra steps to perform with non-AIX MPIO drivers, thereby aligning the non-AIX MPIO drivers with MPIO procedures.

The above-described functions associated with executing a script to support boot from SAN operations (e.g., bosboot operations) on non-AIX devices in the MPIO driver 112-1 are carried out at least in part under the control of its path selection logic 114-1 and/or boot from SAN operation support logic 116-1. For example, the path selection logic 114-1 and/or boot from SAN operation support logic 116-1 are illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for boot image create operation support.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in "Dell EMC SC Series Storage and Microsoft Multipath I/O," Dell EMC, CML 1004, July 2018, which is incorporated by reference herein. Such conventional MPIO functionality is suitably modified in illustrative embodiments disclosed herein to support execution of a script to support boot from SAN operations (e.g., bosboot operations) on non-AIX devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 and boot from SAN operation support logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 202, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
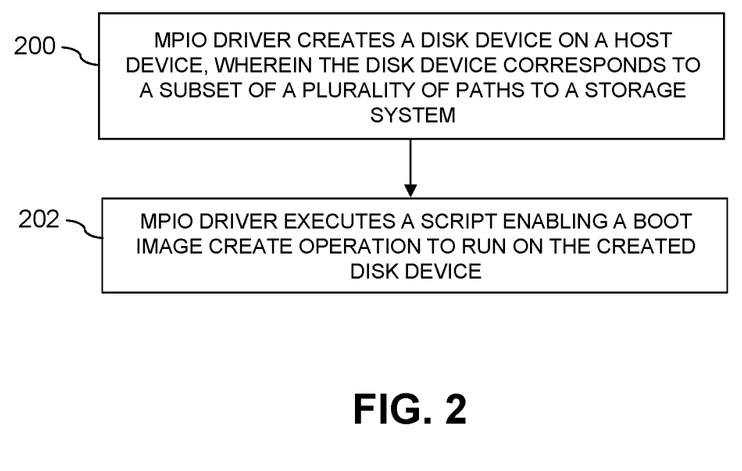
FIG. 2 is a flow diagram of a process for boot from SAN operation support in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 and/or boot from SAN operation support logic 116-1 of the MPIO driver 112-1 of host device 102-1. Other arrangements of host device components and/or other system components can be configured to perform at least portions of one or more of the steps in other embodiments.

In step 200, the MPIO driver creates a disk device on the host device. The disk device corresponds to a subset of the plurality of paths to the storage system. As described herein, the boot image create operation comprises a bosboot operation, the created disk device comprises an hdiskpower device, and the subset of the plurality of paths comprises one or more hdisks.

In step 202, the MPIO driver executes a script enabling a boot image create operation to run on the created disk device. In an embodiment, the script modifies a boot image create operation utility to allow the boot image create operation to be performed on a specified category of devices corresponding to the created disk device. The specified category comprises hdiskpower devices.

According to an embodiment, the MPIO driver is further configured to move the created disk device and one or more additional disk devices on the host device from an available state to a defined state, wherein the defined state comprises at least one of an unconfigured state and an unavailable state.

The MPIO driver may be configured to clear the subset of the plurality of paths to the storage system from the PVID, and to create a copy of an operating system of the host device on a storage device of the storage system corresponding to at least one path of the subset of the plurality of paths.

In one or more embodiments, the MPIO driver is further configured to run the boot image create operation on the created disk device to create a boot image, and wherein the boot image is pushed to the created disk device and to the subset of the plurality of paths. The MPIO driver is also configured to generate a boot logical volume on the created disk device responsive to the creation of the boot image and subsequent rebooting of the host device.

Multiple additional instances of the FIG. 2 process may be performed in respective additional host devices that share the storage array. Other embodiments can include multiple storage arrays, with the disclosed functionality for boot image create operation support being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for executing a script to support bosboot operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
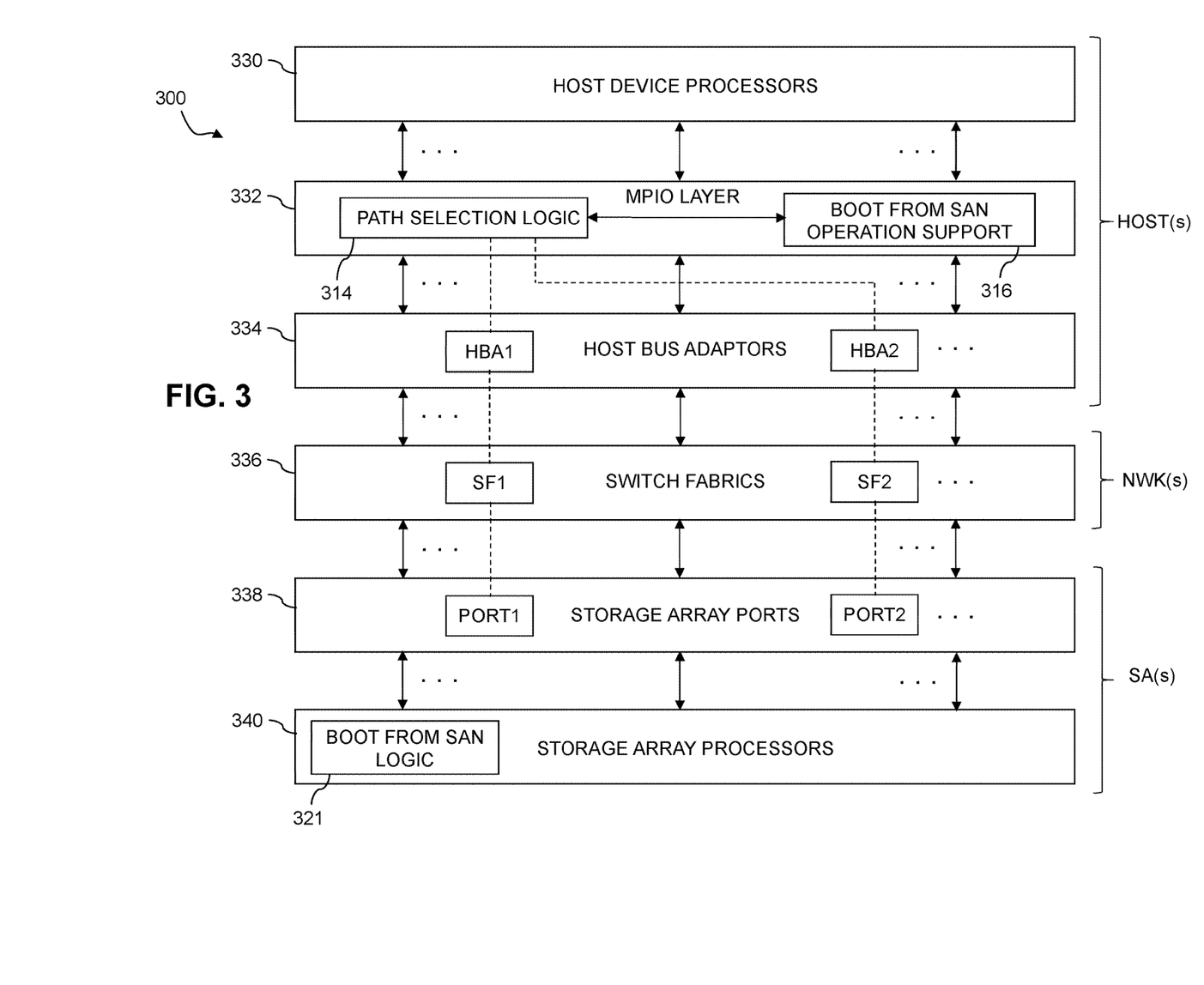
FIG. 3 is a block diagram showing multiple layers of a layered system architecture that includes a multi-path layer with functionality for boot from SAN operation support in an illustrative embodiment.

Referring now to FIG. 3, another illustrative embodiment is shown. In this embodiment, an information processing system 300 comprises one or more instances of path selection logic 314, boot from SAN operation support logic 316 and boot from SAN logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements execution of a script to support bosboot operations as characterized by boot from SAN operation support logic 316. The boot from SAN operation support logic 316 is illustratively shown as part of the MPIO layer 332. Alternatively, the boot from SAN operation support logic 316 in other embodiments is illustratively stored, at least partially, in the host device processor layer 330. It is also possible in some embodiments that the boot from SAN operation support logic 316 can be incorporated within a data structure of the path selection logic 314. During boot from SAN operations, the boot from SAN operation support logic 316 illustratively executes a script which will modify a bosboot script. This enables bosboot support on devices such as, for example, non-AIX devices (e.g., hdiskpower devices). The embodiments eliminate the need for a pprootdev script to move a PVID from an unsupported operating system device (e.g., non-AIX) to supported operating system device (e.g., AIX) prior to running a bosboot operation. One or more storage array processors (e.g., storage controllers 120) of the storage array processor layer 340 in conjunction with boot from SAN logic 122 or 321 support and execute the boot from SAN operations on the storage array side.

The boot from SAN operation support logic 316, by enabling bosboot operations on non-AIX devices, eliminates or reduces reboots required during MPIO driver boot from SAN operations. As a result, boot from SAN setup and maintenance procedures are simplified, and the number of overall steps involved in boot from SAN operations where boot images are created is reduced. Additionally, during uninstalling of non-AIX MPIO drivers, or during disabling of a boot from SAN setup, the boot from SAN operation support logic 316 or 116 is configured to enable reverting to an operating system's original bosboot script by executing a pseudo_bosboot disable command. Thus, bosboot functionality is unaltered after uninstalling a non-AIX MPIO driver.

The MPIO layer 332 is an example of what is also referred to herein as a multi-path layer, and comprises one or more MPIO drivers implemented in respective host devices. Each such MPIO driver illustratively comprises an instance of path selection logic 314 and boot from SAN operation support logic 316 configured to implement functionality for enabling boot image create operations on unsupported devices. Additional or alternative layers and path selection and/or boot from SAN operation support logic arrangements can be used in other embodiments.

The boot from SAN logic 321 implemented in the storage array processor layer 340 controls storage of operating system copies and boot images in storage devices of a storage array that correspond the hdisks. The boot from SAN logic 321 and the boot from SAN logic 122 include the same or similar functionality for the systems 300 and 100, respectively. It is also possible in some embodiments that the boot from SAN logic 321 can include multiple logic instances for respective ones of a plurality of storage arrays of the system 300.

In the system 300, path selection logic 314 is configured to select different paths for sending IO operations and/or commands from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations and/or commands to the one or more storage arrays having the storage array ports of the storage array port layer 338. In selecting the paths, the path selection logic 314 illustratively limits amounts of IO operations and/or commands that are delivered over one or more paths to particular ones of the ports of a storage array.

It is assumed in this embodiment that the host devices through their respective MPIO drivers and respective instances of path selection logic 314 and boot from SAN operation support logic 316 provide functionality for enabling boot image create operations on unsupported devices, possibly with involvement of other host device components.

Accordingly, in some embodiments, the path selection logic 314 utilizes the boot from SAN operation support logic 316 in determining appropriate paths over which to send particular IO operations and/or commands to ports of one or more storage arrays. As described elsewhere herein, such enablement of boot image create operations on unsupported devices can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides the disclosed for boot image create operation support functionality, under the control of a corresponding instance of path selection logic and/or boot from SAN operation support logic implemented in the MPIO driver, possibly with involvement of one or more other host device components.

Figure 4:
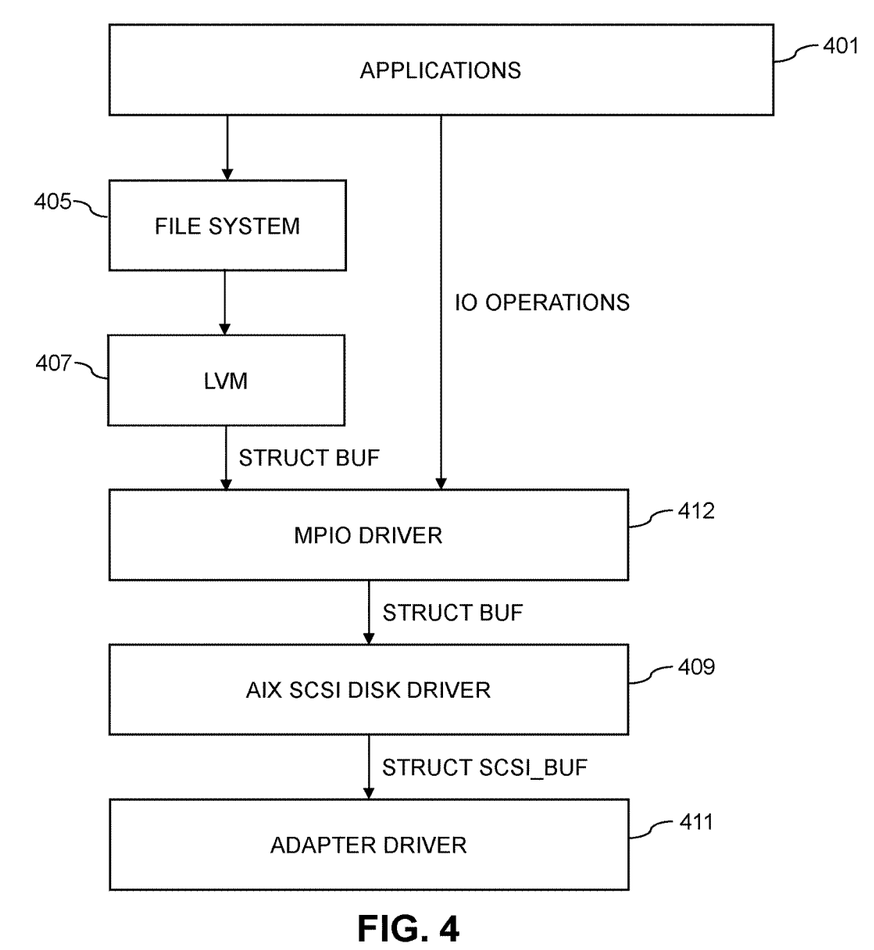
FIG. 4 depicts an MPIO driver with boot from SAN operation support on top of an AIX native device in an illustrative embodiment.

Referring to FIG. 4, applications 401, for example, running on a host device, process 10 operations through an MPIO driver 412 with boot from SAN operation support configured on top of an AIX native device, for example, AIX SCSI disk driver 409. The AIX SCSI disk driver 409 communicates with an adapter driver 411. The IO operations are received by a file system 405 such as, for example, a storage array, which is connected to an LVM 407 communicating with the MPIO driver 412. Communications include, for example, struct buf and struct SCSI_buf commands.

Figure 5:
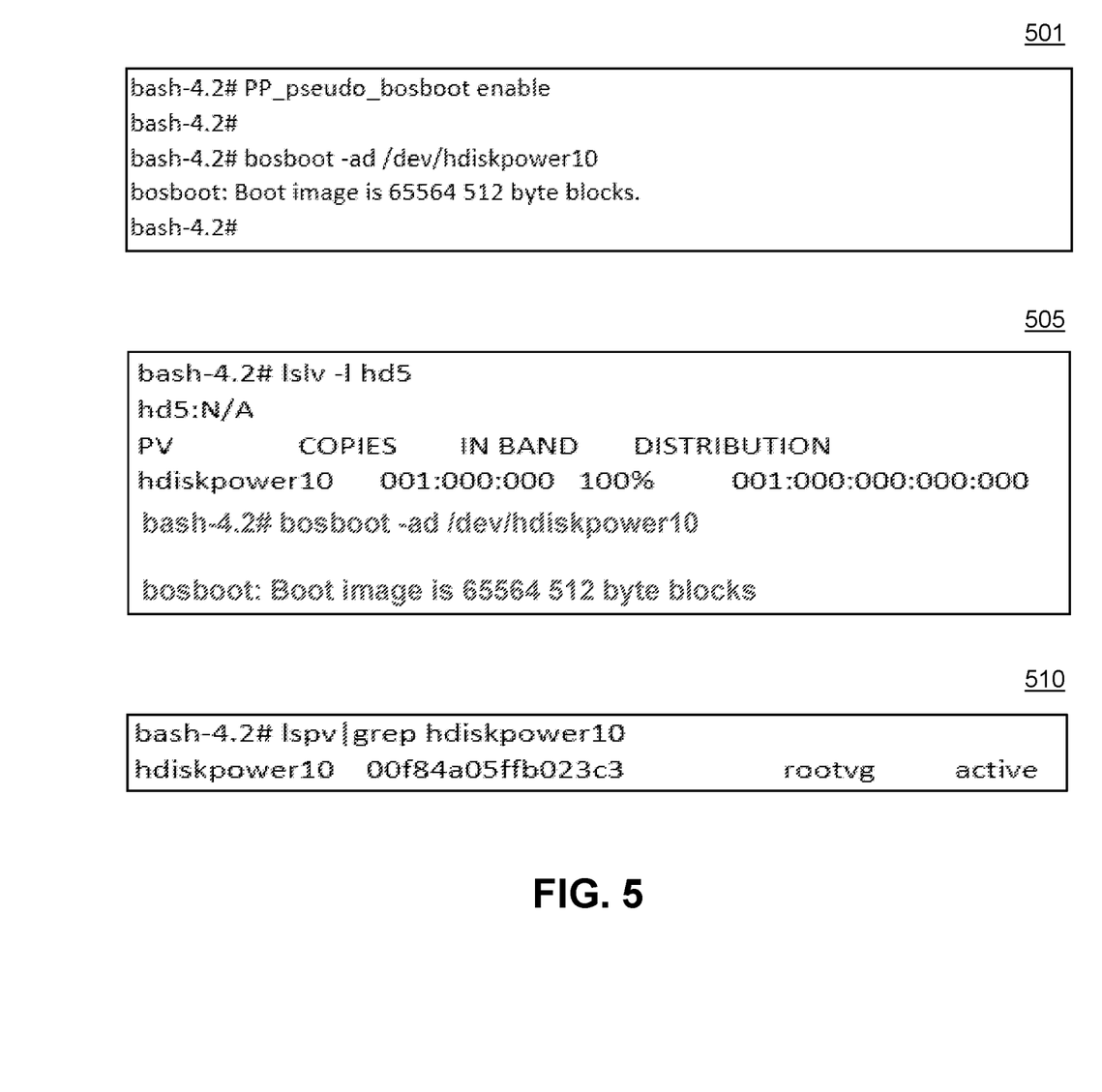
FIG. 5 depicts example pseudocode showing successful implementation of a bosboot command utility in an MPIO driver in an illustrative embodiment.
Figure 6:
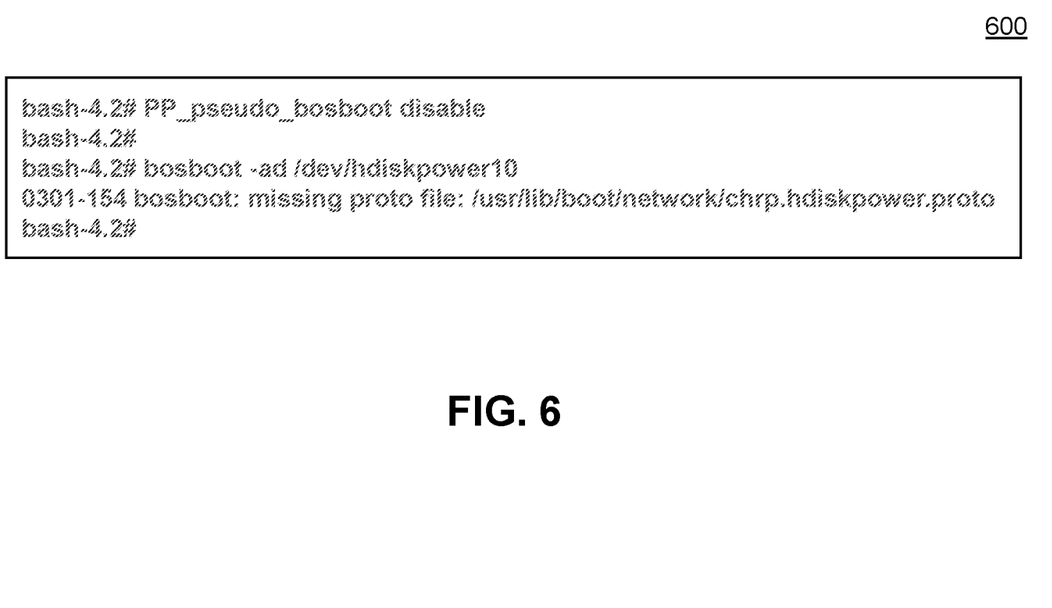
FIG. 6 depicts example pseudocode showing disabling of a bosboot command utility in an illustrative embodiment.

FIG. 5 depicts example pseudocode showing successful implementation of a bosboot command utility in an MPIO driver in an illustrative embodiment. More specifically, the pseudocode 501 depicts the commands described above for executing the script enabling the boot image create operation (e.g., bosboot operation) to run on an hdiskpower device (e.g., hdiskpower10). Referring to the pseudocode 505 and 510, the boot image is created and the hdiskpower device is active. FIG. 6 depicts example pseudocode 600 showing commands for disabling of a bosboot command utility in an illustrative embodiment.

The particular features and functionality of the illustrative embodiments described above can be varied in other embodiments. Also, as mentioned previously, different instances of the above-described algorithms and other boot image creation support techniques can be performed by different MPIO drivers in different host devices.

The particular boot from SAN operation support arrangements described above are therefore presented by way of illustrative example only. Numerous alternative arrangements of these and other features can be used in implementing the boot from SAN operation support functionality in other illustrative embodiments.

The illustrative embodiments disclosed herein can provide a number of significant advantages relative to conventional arrangements that are limited to the pprootdev tool. Advantageously, the embodiments eliminate the need for a pprootdev script to move a PVID from a non-AIX operating system device to an AIX operating system device prior to running a bosboot operation. These embodiments provide a significant advance over conventional techniques, where a system may become unresponsive in the event of path issues to the rootvg LUNs, and the system may encounter slow-performance since swap space resides on a SAN in a boot from SAN environment. Illustrative embodiments are advantageously configured to maintain PVIDs on non-AIX multi-pathing devices (e.g., hdiskpower devices) at any given point of time. Thus, multipathing and redundancy to a boot device is ensured, there is no requirement of moving PVIDs to hdisks for bosboot operations to succeed and a customer's automated maintenance procedures are supported.

Moreover, the embodiments provide advances over existing technology by providing for reverting to an operating system's original bosboot script by executing a pseudo_bosboot disable command during uninstalling of non-AIX MPIO drivers, or during disabling of a boot from SAN setup.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114, boot from SAN operation support logic 116 and boot from SAN logic 122 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, boot from SAN operation support logic, boot from SAN logic and additional or alternative components. Also, the particular configurations of system and device elements and associated processing operations illustratively shown in the drawings can be varied in other embodiments. For example, a wide variety of different MPIO driver configurations and associated boot from SAN operation support arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to a memory;
the host device being configured to communicate over a network with a storage system;
the host device comprising:
a multi-path input-output driver configured to control delivery of input-output operations from the host device to the storage system over selected ones of a plurality of paths through the network;
wherein the multi-path input-output driver is further configured:
to create a disk device on the host device, wherein the disk device corresponds to a subset of the plurality of paths to the storage system; and
to execute a script enabling a boot image create operation to run on the created disk device.

2. The apparatus of claim 1 wherein the script modifies a boot image create operation utility to allow the boot image create operation to be performed on a specified category of devices corresponding to the created disk device.

3. The apparatus of claim 2 wherein the boot image create operation comprises a bosboot operation and the specified category comprises hdiskpower devices.

4. The apparatus of claim 1 wherein the boot image operation comprises a bosboot operation.

5. The apparatus of claim 4 wherein the created disk device comprises an hdiskpower device.

6. The apparatus of claim 5 wherein the subset of the plurality of paths comprises one or more hdisks.

7. The apparatus of claim 1 wherein the multi-path input-output driver is further configured to move the created disk device and one or more additional disk devices on the host device from an available state to a defined state, wherein the defined state comprises at least one of an unconfigured state and an unavailable state.

8. The apparatus of claim 1 wherein the multi-path input-output driver is further configured to clear the subset of the plurality of paths to the storage system from physical volume identification information.

9. The apparatus of claim 1 wherein the multi-path input-output driver is further configured to create a copy of an operating system of the host device on a storage device of the storage system corresponding to at least one path of the subset of the plurality of paths.

10. The apparatus of claim 1 wherein the multi-path input-output driver is further configured to run the boot image create operation on the created disk device to create a boot image, and wherein the boot image is pushed to the created disk device and to the subset of the plurality of paths.

11. The apparatus of claim 1 the multi-path input-output driver is further configured to generate a boot logical volume on the created disk device responsive to the creation of the boot image and subsequent rebooting of the host device.

12. A method performed by a host device configured to communicate over a network with a storage system, comprising:
configuring a multi-path input-output driver of the host device to control delivery of input-output operations from the host device over selected ones of a plurality of paths through the network;
the multi-path input-output driver:
creating a disk device on the host device, wherein the disk device corresponds to a subset of the plurality of paths to the storage system; and
executing a script enabling a boot image create operation to run on the created disk device;
wherein the host device comprises a processor coupled to a memory.

13. The method of claim 12 wherein the script modifies a boot image create operation utility to allow the boot image create operation to be performed on a specified category of devices corresponding to the created disk device.

14. The method of claim 13 wherein the boot image create operation comprises a bosboot operation and the specified category comprises hdiskpower devices.

15. The method of claim 14 wherein the boot image operation comprises a bosboot operation, and the created disk device comprises an hdiskpower device.

16. The method of claim 12 further comprising running the boot image create operation on the created disk device to create a boot image, wherein the boot image is pushed to the created disk device and to the subset of the plurality of paths.

17. The method of claim 12 further comprising generating a boot logical volume on the created disk device responsive to the creation of the boot image and subsequent rebooting of the host device.

18. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:
to control delivery of input-output operations from the host device to the storage system over selected ones of a plurality of paths through the network;
to create a disk device on the host device, wherein the disk device corresponds to a subset of the plurality of paths to the storage system; and
to execute a script enabling a boot image create operation to run on the created disk device.

19. The computer program product of claim 18 the script modifies a boot image create operation utility to allow the boot image create operation to be performed on a specified category of devices corresponding to the created disk device.

20. The computer program product of claim 19 wherein the boot image create operation comprises a bosboot operation and the specified category comprises hdiskpower devices.

* * * * *